(12) United States Patent
Fleming (10) Patent No.: US 9,276,463 B2
(45) Date of Patent: Mar. 1, 2016

(54) LOW POWER CONVERSION AND MANAGEMENT OF ENERGY HARVESTING APPLICATIONS

(75) Inventor: Jerry W. Fleming, Moneta, VA (US)

(73) Assignee: MACAULAY-BROWN, INC., Dayton, OH (US)

( * ) Notice: Subject to any disclaimer, the term of this patent is extended or adjusted under 35 U.S.C. 154(b) by 1349 days.

(21) Appl. No.: 13/072,234

(22) Filed: Mar. 25, 2011

(65) Prior Publication Data

US 2011/0254514 A1 Oct. 20, 2011

Related U.S. Application Data

(60) Provisional application No. 61/320,892, filed on Apr. 5, 2010.

(51) Int. Cl.
*H02J 7/00* (2006.01)
*H02M 3/07* (2006.01)
*H02M 3/158* (2006.01)
*H02J 9/00* (2006.01)

(52) U.S. Cl.
CPC ............... *H02M 3/07* (2013.01); *H02M 3/158* (2013.01); *H02J 9/005* (2013.01)

(58) Field of Classification Search
CPC ....................................................... H02M 3/07
USPC ......................................... 320/101, 166, 167
See application file for complete search history.

(56) References Cited

U.S. PATENT DOCUMENTS

| | | | |
|---|---|---|---|
| 6,914,411 B2 | 7/2005 | Couch et al. | |
| 7,692,411 B2 * | 4/2010 | Trainor et al. | ................ 320/166 |
| 7,982,439 B2 * | 7/2011 | Trainor | ................. H01M 10/46 307/109 |
| 8,072,095 B2 * | 12/2011 | Lawrence | ................. H02J 1/14 307/31 |
| 8,525,487 B1 * | 9/2013 | Stevenson | ............. H02J 7/0065 307/109 |
| 8,704,494 B2 * | 4/2014 | LoCascio | ...................... 320/140 |
| 2006/0238311 A1 | 10/2006 | Harman et al. | |

OTHER PUBLICATIONS

Ultralow Voltage Step-Up Converter and Power Manager, LTC3108, Linear Technology, date unknown, pp. 1-20.
MSP430x15x, MSP430x16x, MSP430x161x Mixed Signal Microcontroller, Texas Instruments, SLA368D-Oct. 2002—revised Mar. 2005.
High-Efficiency, SOT23 Step-Down, DC-DC Converter, SLVS417E-Mar. 2002—revised May 2006.

\* cited by examiner

*Primary Examiner* — Richard V Muralidar
(74) *Attorney, Agent, or Firm* — Nixon & Vanderhye P.C.

(57) ABSTRACT

A method and apparatus for low voltage conversion and energy storage uses a charge pump array including a first set of capacitors in parallel with a second set of capacitors and switches for selectively coupling the first and second set of capacitors to a variable input DC voltage. A data processor programmably controls one or more of the switches to couple the first and second set of capacitors to the variable input DC voltage for a variable first time period during which the input DC voltage charges the first and second set of capacitors to a DC voltage level. An energy storage device is switchably coupled to an output of the charge pump array. The data processor programmably controls one or more of the switches to couple the charge pump array output to the energy storage device for a variable second time period during which a voltage stored across each of the capacitors during the first time period is combined to produce a higher voltage significantly higher than the input DC voltage, the higher voltage being provided to the energy storage device.

10 Claims, 10 Drawing Sheets

Figure 12

LOW POWER CONVERSION AND MANAGEMENT OF ENERGY HARVESTING APPLICATIONS

PRIORITY APPLICATION

This application claims priority from U.S. provisional patent application Ser. No. 61/320,892, filed on Apr. 5, 2010, the contents of which are incorporated herein by reference.

STATEMENT REGARDING FEDERALLY SPONSORED RESEARCH OR DEVELOPMENT

At least some of the technology in this application was developed as a result of a government contract with the Air Force Office of Scientific Research Contract Number: FA9550-090C-0065.

TECHNICAL OVERVIEW

The technology relates to ultra-low power conversion and management which is may be used in energy harvesting and many other applications such as sub-threshold boost supply and power management applications.

BACKGROUND

With the rapid miniaturization of portable electronics, such as cell phones, hand held computing devices, wireless sensors, and remote monitoring applications, the availability of a reliable power source remains an important design issue. Many applications for wireless sensing exist where battery replacement is economically and logistically impractical, laborious, and potentially dangerous. Collecting and storing power from ambient energy harvesting devices remains a desirable option for greatly extending battery life, replenishing depleted batteries, or simply replacing the need for batteries entirely.

Ambient energy harvesting is increasingly gaining acceptance as a potential power source that can be used for numerous commercial and military applications. But a problem for power electronic designers is incorporating energy harvesting methods into their designs given the relatively small voltage levels typically available from energy harvesting device technologies. In order to solve this problem, an ultra-low input voltage power conversion method is needed to convert small amounts of scavenged energy into a usable form of electricity. Such a method would enable new and improved medical devices, sensor systems, and other portable electronic products.

Thermoelectric harvesting devices deliver relatively high currents at sub-transistor threshold voltages when exposed to low temperature gradients. These voltages are on the order of 20 mV, which is much lower than the operational threshold voltages for standard power conversion electronic integrated circuits. What is needed then is a low-power, ultra-low input voltage DC to DC converter for thermoelectric energy harvesting at low temperature gradients.

Experienced power designers have explored using magnetics, such as a transformer controlled by MOSFETs driven from a low voltage oscillator to boost small voltages. For example, Linear Technologies offers an "Ultralow Voltage Step-Up Converter and Power Manager" called the LTC3108. The LTC3108 has an efficiency of about 50%, and the output current is stated to be 3 mA. Both of these specifications are lower than desired for thermoelectric generators that output relatively high current and ultra-low voltage when exposed to a small thermal gradient.

SUMMARY

An apparatus for low voltage conversion and energy storage includes a charge pump array with a first set of capacitors in parallel with a second set of capacitors and switches for selectively coupling the first and second set of capacitors to a variable input DC voltage. A data processor programmably controls one or more of the switches to couple the first and second set of capacitors to the variable input DC voltage for a variable first time period during which the input DC voltage charges the first and second set of capacitors to a DC voltage level. An energy storage device is switchably coupled to an output of the charge pump array. The data processor programmably controls one or more of the switches to couple the charge pump array output to the energy storage device for a variable second time period during which a voltage stored across each of the capacitors during the first time period is combined to produce a higher voltage significantly higher than the input DC voltage, the higher voltage being provided to the energy storage device.

In one non-limiting example implementation, the higher voltage is at least twice as large as the input DC voltage.

In one non-limiting example embodiment, the variable input DC voltage is provided by a low voltage generator, and the data processor matches an impedance of at least the charge pump array to an impedance of the low voltage generator. The data processor detects a current impedance of the low voltage generator and varies the first and second variable time periods based on the detected current impedance of the low voltage generator so as to match the impedance of at least the charge pump array to the detected current impedance of the low voltage generator. The data processor varies the first and second variable time periods by toggling switch control signals used to control switches in the charge pump array.

In one non-limiting example implementation, wherein the first and second groups of capacitors each includes multiple capacitors connected in series.

In one non-limiting example application, the apparatus is coupled to a load which draws on energy from the energy storage device.

In one non-limiting example implementation, energy storage device circuitry protects the energy storage device from electrical faults.

In one non-limiting example application, the apparatus is coupled to an energy harvesting device for generating the variable input DC voltage. The energy harvesting device produces energy inconsistently. For example, the energy harvesting device may include any one of the following: a thermoelectric generator, a photovoltaic device, a mechanical vibration harvesting device, and a radio frequency harvesting device.

In one non-limiting example implementation, step-down switch circuitry is coupled to the energy storage device for providing a stepped-down voltage to the data processor.

In one non-limiting example embodiment, the data processor may be programmed to operate in multiple modes including a normal mode and a low power mode. The data processor enters the low power mode when the variable input DC voltage is less than a predetermined minimum level. The data processor is programmed to operate in a brownout mode and enters the brownout mode when the variable input DC voltage is less than a previously stored value of the variable input DC voltage.

In one non-limiting example implementation, the data processor is programmed to control a timing and/or duration of the first and second variable time periods.

One significant advantage of the technology is the ability of the apparatus to convert the input DC voltage to the higher output voltage with an efficiency of 90% or higher. As one example, the apparatus can handle an input voltage on the order of 20 millivolts and a current on the order of tenths of amps to produce an output voltage on the order of tenths of volts to over one volt.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology relates to a very low input voltage DC to DC power supply with a very high efficiency for use in very low power applications such as energy harvesting. A low-power, low input voltage DC to DC converter, e.g., for thermoelectric energy harvesting at low temperature gradients, is provided that converts low power, low voltage DC to usable DC levels for storage. The load and supply management functionality is controlled in a deterministic manner. The DC to DC converter provides a universal solution for all types of energy harvesting and many other low voltage boost supply applications.

In one non-limiting example embodiment, the DC to DC converter input operating voltage is 20 mV with a conversion efficiency of 90% or more. The output voltage may be stored in a storage device such as an ultra-capacitor or lithium-ion battery for use during brown-out or unfavorable harvesting conditions.

In one non-limiting example embodiment, the DC to DC converter includes an array of analog switches and capacitors to form a unique charge-pump topology. The power supply that includes the DC to DC converter is controlled by a data processor executing software algorithms designed to manage and adapt to unknown operating conditions, such as start up or unfavorable harvesting conditions. Control algorithms are implemented to control the stand-by or ultra-low power modes of operation to minimize system current drain during unfavorable harvesting conditions. The data processor preferably matches the harvesting device characteristic output, such as a thermoelectric generator output impedance, to maximize the energy transfer and efficiency during normal harvesting conditions.

A charge pump power supply is a DC to DC converter that uses capacitors as energy storage elements to efficiently create either a higher or lower output voltage power source. Charge pump circuits can produce conversion efficiencies as high as 90-95% at low cost, and thus, are well suited for ultra-low power applications. Analog switches are used to control the connection of voltages to several capacitors.

Figure 1:
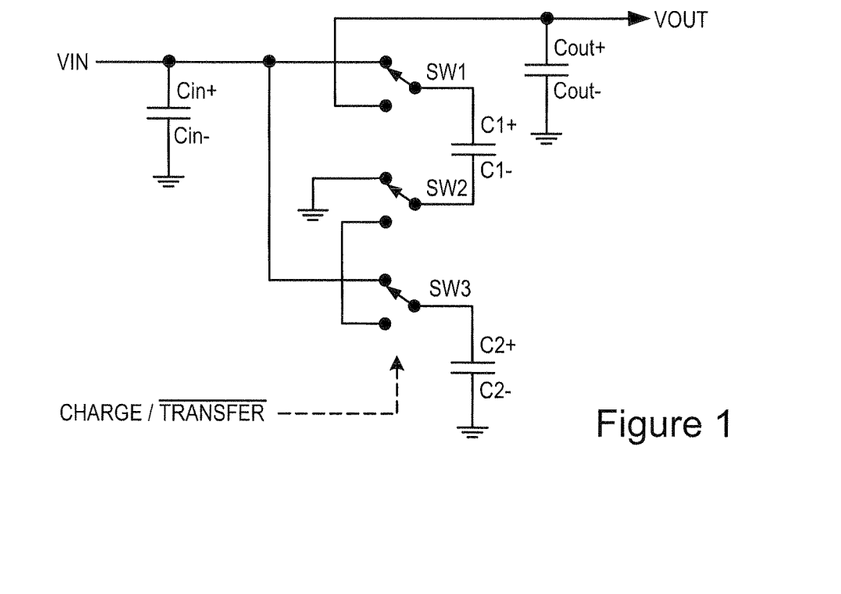
FIG. 1 is an example of a 2× charge pump.

A 2× boost charge pump is shown in FIG. 1. Analog switches SW1, SW2 and SW3 are closed when a switch control signal is asserted in a "charge phase" to charge C1 and C2 to the input voltage present at VIN. During the following phase, switches SW1, SW2 and SW3 are opened when the switch control signal is de-asserted, connecting C1 and C2 in series resulting in an output voltage of VOUT, which is effectively double the input voltage VIN. Pulsing or switching noise is filtered by the capacitor COUT. The charge pump may operate from about 50 KHz to several megahertz to reduce the amount of capacitance. The storage capacitor capacitance and switching frequency are preferably designed to achieve the high efficiency and low current drain. The charge pump in FIG. 1 can be configured to double voltages, triple voltages, halve voltages, invert voltages, fractionally multiply or scale voltages such as ×3/2, ×4/3, ×2/3, etc., and generate arbitrary voltages depending on the controller and circuit implementation.

The inventor recognized the significant advantages that could flow from an intelligent power supply based upon a charge pump that is carefully controlled by a low power microprocessor. He realized that this type of deterministic control allows a precise determination to be made for the ever changing input conditions. The data processor master clock is synthesized to provide a synchronous system for the sampling, timing, and precise control for efficient energy harvesting, where startup and operating conditions, as well as input and output load conditions, are difficult to predict and not consistent.

Figure 2:
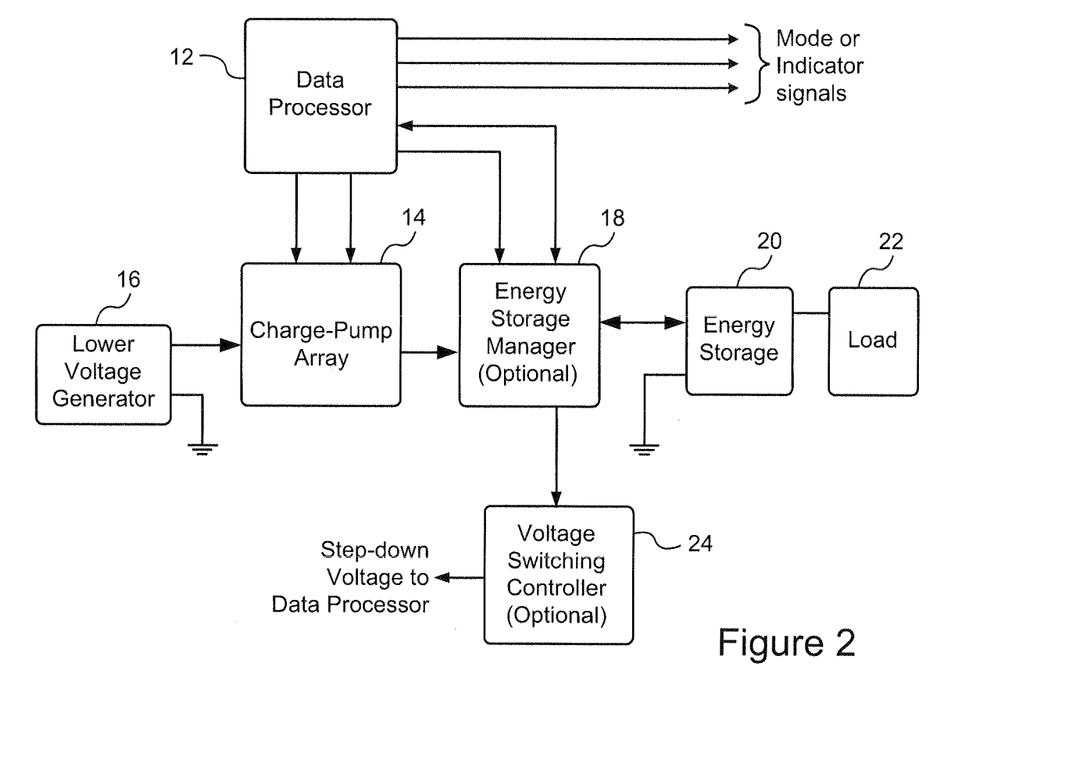
FIG. 2 shows a non-limiting example power conversion and management system architecture.

FIG. 2 shows a non-limiting example power conversion and management system architecture 10. A data processor 12, preferably a low power data processor, is coupled to control operation of a charge pump array 14 and an optional energy storage manager 18. A low voltage source or generator 16 provides a low input voltage to the charge pump array 14 which boosts that voltage to an output voltage level that is useful for storage in an energy storage device 20, e.g., a rechargeable battery. The output voltage may be coupled directly to the energy storage 20 or indirectly via the optional energy storage manager 18. The energy storage may also be coupled to a load 22. Also shown is an optional voltage switching converter 24 coupled to the optional energy storage manager 18 for stepping the voltage from the energy storage device 20 to a level suitable for powering the data processor 12.

As mentioned above, the low voltage source or generator 16 may produce a voltage signal unpredictably and sporadically. The intelligent control provided by the data processor 12 allows for operation of the apparatus in a power conserving "sleep" mode when no sufficient voltage is detected and to wake up with sufficient frequency in order to see if a sufficient voltage is currently being produced by the low voltage source or generator 16 in which case the data processor 12 operates the apparatus in a normal mode. In that normal mode, the data processor 12 controls the charge pump array 14 to switch between charging and transfer cycles that effectively converts the very low input voltage to a useable output voltage. In order to achieve very high efficiency, the data processor 12 also makes an impedance determination from which it controls operation of the charge pump array 14 so that the impedance of the low voltage source or generator 16 is load matched. With precise load matching, a very high efficiency of energy conversion, e.g., on the order of 90% efficiency can be achieved.

Figure 3:
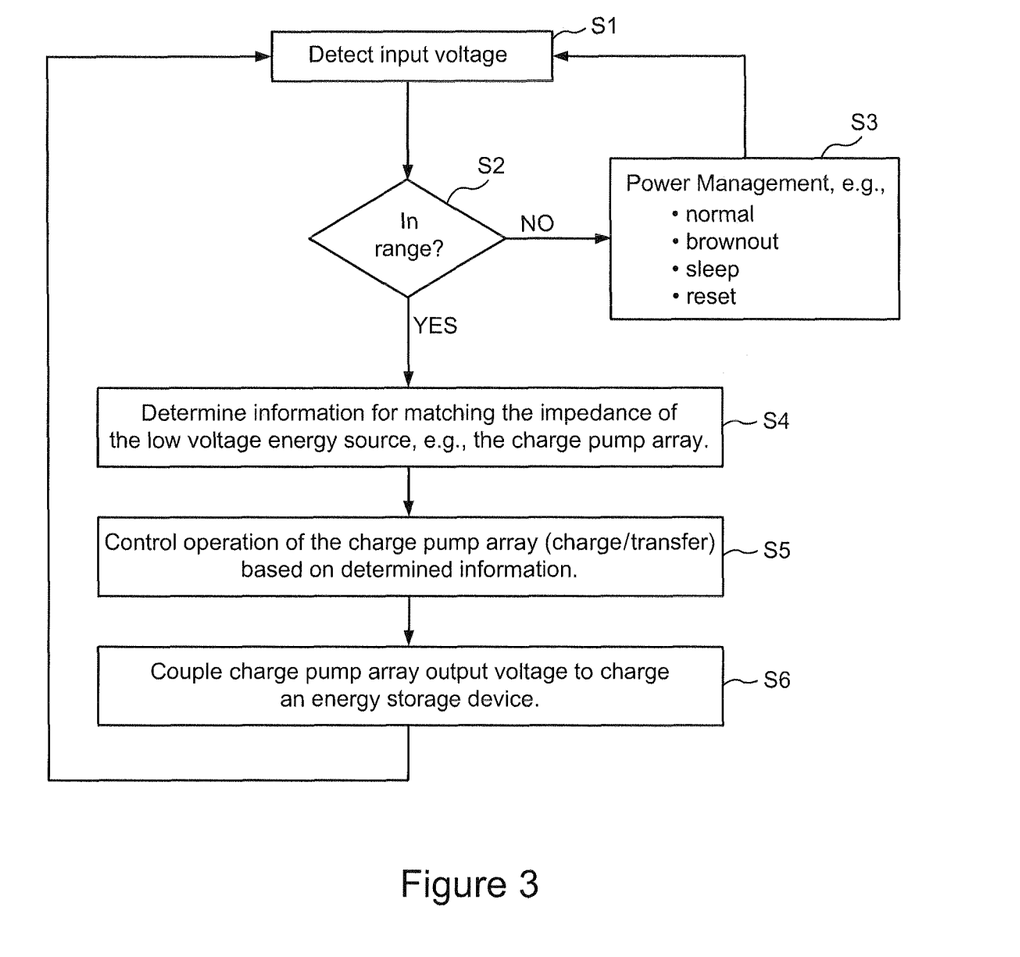
FIG. 3 is a flowchart illustrating non-limiting example procedures for low power conversion and management of energy harvesting applications.

FIG. 3 is a flowchart illustrating non-limiting example procedures for low power conversion and management. Initially, the input voltage provided by the low voltage source or generator 16 is detected (step S1), e.g., sampled by an analog-to-digital converter port in the data processor 12. The data processor 12 decides whether the detected input voltage is in a desired range (step S2). If not, some power management operation (step S3) is preferably (though not necessarily performed) before returning to step S1. Non-limiting example power management operations include setting a mode of the data processor, e.g., normal, brownout, sleep, reset, etc., which in turn controls the operational mode of the overall apparatus. In step S4, the data processor 12 determines information for use in matching the impedance of the low voltage energy source to the rest of the apparatus. The inventor determined that for many applications, one (but not the only) effective way to make this impedance matching determination was to match the impedance of the low voltage energy source to the impedance of the charge pump array 14. The determined information, e.g., a switching frequency or duty cycle, is then used by the data processor 12 for controlling the operation of the charge pump array 14 to achieve the voltage conversion with high efficiency (step S5). The higher voltage output from the charge pump array 14 is then coupled directly or indirectly to the energy storage device (step S6) and the process repeats.

Figure 4:
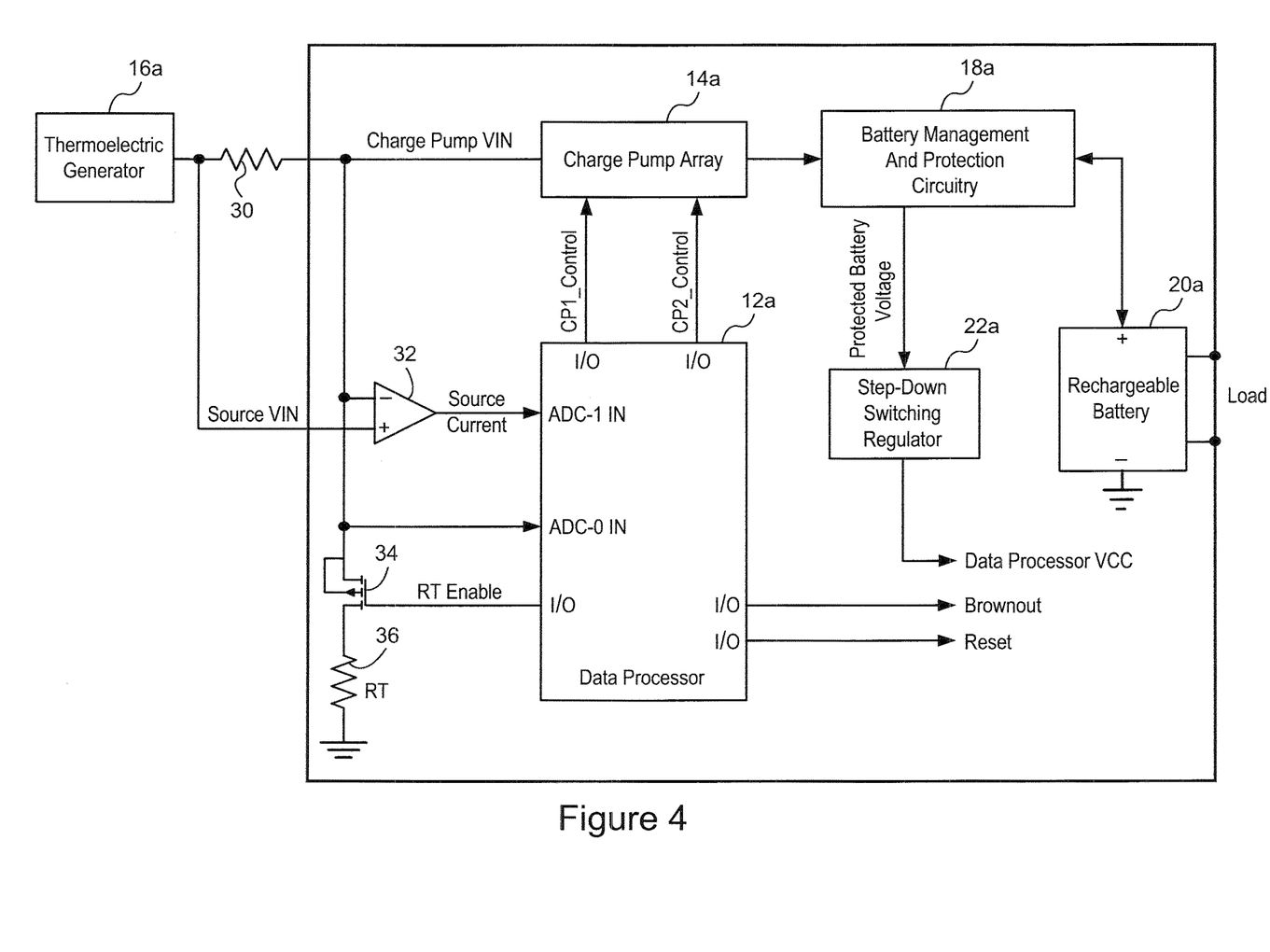
FIG. 4 is one non-limiting example configuration for the power conversion and management system architecture.

FIG. 4 is one non-limiting example configuration for the power conversion and management system architecture an energy harvesting application, although it is understood that this technology may be used for many other applications. In particular, FIG. 4 shows a non-limiting example of a high efficiency, charge pump DC to DC power supply for a thermoelectric harvesting device 16a. Thermoelectric generators are devices that output relatively high currents and low voltage when exposed to a small thermal gradient. For example, electrical output characteristics of one non-limiting, example thermoelectric device operating at ΔT 25K thermal gradient might be an output voltage of 26 mW or 0.077 Volts with an output current of 0.336 Amps. A non-limiting example range of low input voltages might include 0.020 volts to 4.50 volts, and a non-limiting example range of high output currents might include 0.050 amps to 0.500 amps. Existing power conversion devices do not meet the both the high current and low voltage input requirements of such a thermoelectric generator.

A non-limiting example of a low power data processor 12a is a Texas Instruments MSP430 microprocessor. If the TI MSP430 is used, then a +1.8 volt system bootstrap voltage can be generated from a Texas Instruments Semiconductor TPS62202 DBV High Efficiency Step-Down Converter step-down switching supply, though any suitable step-down switching regulator 22a may be used. This supply powers the microprocessor and analog switches used in the charge pump array 14a. In one non-limiting example, the quiescent current drain for the data processor and analog switches is less than 20 uA in stand-by mode and approximately 100 uA when the data processor is active in a low power mode. The output of the charge pump array 14a is provided through optional battery management and protection circuitry 18a to a rechargeable battery 20a with terminals for coupling to a load.

The data processor's onboard analog to digital converter (ADC-0) samples the thermoelectric voltage to determine if adequate energy is available to re-charge the battery. The current sourced by the thermoelectric generator 16a is determined by measuring the voltage drop across a precision resistor 30, e.g., 0.01Ω, using a differential operational amplifier 32. The data processor 12a (ADC-1) samples the output of the operational amplifier at ADC-1. The voltage sampled is a fraction, e.g., one tenth for a 0.01Ω resistor, of the thermoelectric generator output 16a source current. A precision reference load resistor RT 36 is switched between ground and open circuit by the data processor I/O RT_Enable. When the termination resistor is enabled, the output of the impedance of thermoelectric device is load-matched into RT 36 as specified by the device manufacturer. Knowing the charge pump input voltage 14a and the thermoelectric generator source current into the matched load, the charge pump impedance can be calculated or calibrated at any time mathematically. When RT is de-asserted by the data processor 12a, RT 36 is an open circuit, and the charge pump is calibrated by adjusting the frequency of the data processor charge pump controls to match the reference impedance of RT 36.

A software program executed by the data processor 12a manages the assertion of reset during start-up, brown-out, and/or other operating conditions/modes. If desired, the data processor 12a can provide a flag or other indicator indicating the state of charge of the rechargeable battery 20a. Other software algorithms control the charge pump and load balancing for the thermoelectric generator 16a, examples of which are described below.

Figure 5:
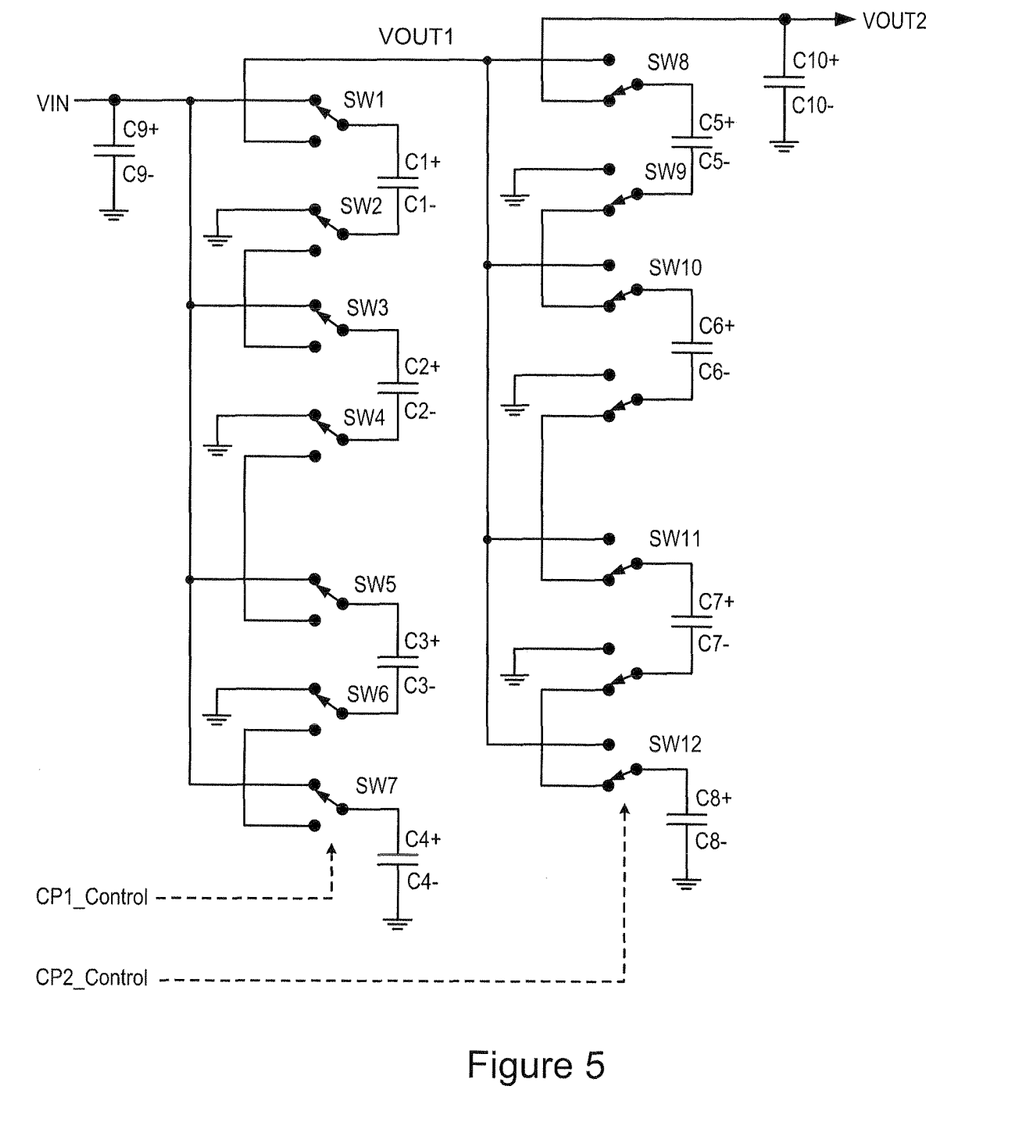
FIG. 5 is an example of a 16× charge pump that may be used in the non-limiting example of FIG. 4.

FIG. 5 is an example of a 16× charge pump (CP) that may be used in the non-limiting example of FIG. 4. FIG. 5 includes two independent charge pump converters CP1 and CP2 cascaded to collectively boost VIN voltage by a factor of sixteen. Both charge pump converters are independently controlled by the data processor's output CP1_Control and CP2_Control. Each charge pump in this non-limiting example includes seven double-pole, double-throw switches, such as those available from Analog Devices ADG888YRUZ. Of course, any other suitable switches may be used. The switches are controlled by the data processor's output CP1_Control to charge four flying capacitors C1-C4 in parallel during Phase 1, called the charge phase. During Phase 1, switches 1-7 are closed, and capacitors C1-C4 are charged in parallel to voltage applied to VIN provided by the low voltage generator. In Phase 2, called the transfer phase, the data processor's output CP1_Control opens switches 1-7 and places capacitors C1-C4 in series resulting in a Vout1 that is four times the voltage of VIN. The second charge pump in response to the data processor's output CP2_Control also charges capacitors C5-C8 in parallel during Phase 1 during which switches 8-14 are closed and C5-C8 are charged to Vout1. In Phase 2, switches 8-14 are opened, and capacitors C5-C8 are placed in a series configuration resulting in Vout2 that is four times the voltage of Vout1. In this way, a very low voltage can be stepped up to a relatively higher voltage with low expense, low power, and high efficiency.

Managing the startup sequence of analog circuits like those in the charge pump in FIG. 5 can be important, especially when addressing the startup sequence of a switch mode power supply such as the example DC to DC converter in FIG. 5. Preferably, a soft start cycle is used that limits the inrush current required to charge capacitors and power up each circuit in the supply topology in a graceful deterministic manner. Applying a voltage to a device input before the device is powered can cause latch-up conditions or result in excessive current drain through device input protection diodes (not shown). Since low power operation is desired, switching currents used to charge large capacitive loads are preferably minimized.

Figure 6:
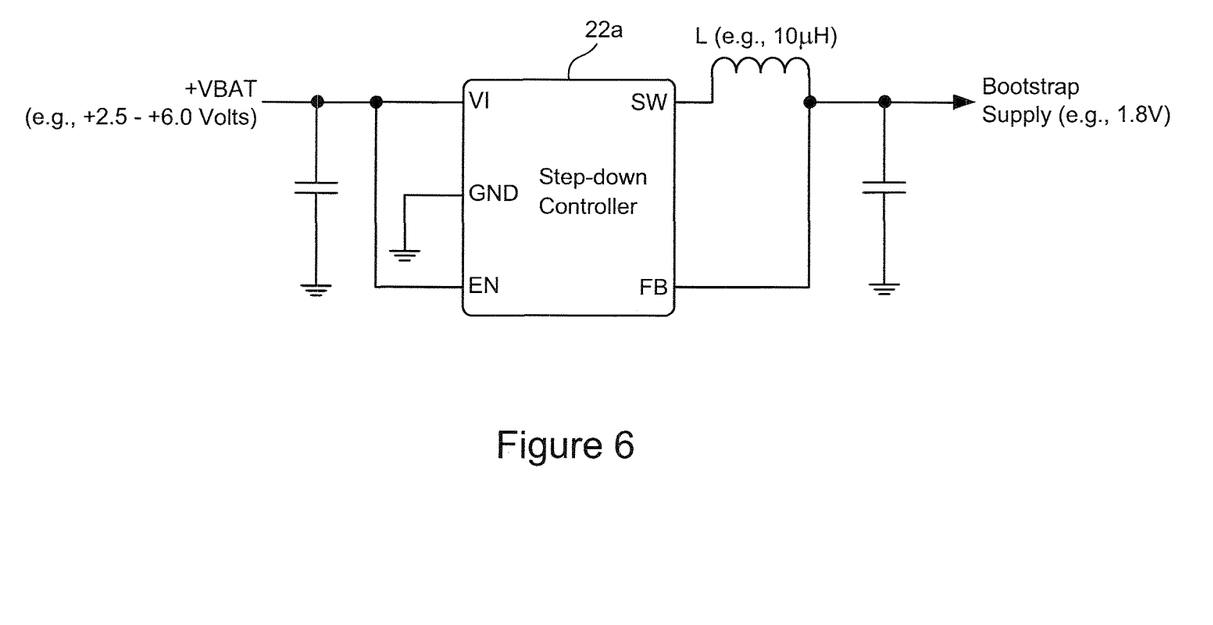
FIG. 6 is a non-limiting example configuration for a step-down switching supply controller for use with the non-limiting example in FIG. 4.

While various methods to create an independent bootstrap supply from the harvesting device output may be used, a continuous bootstrap supply to power the data processor 12a is preferred where a supply is always present to power the critical control elements such as the microprocessor and the analog switches in the charge pump supply. One task is managing changing DC to DC converter operating conditions during startup, normal, operation and periods of brownout conditions. In the non-limiting example of FIG. 6, the step-down converter 22a bootstrap supply is generated by the step-down controller 22a such as the Texas Instruments TPS62202 DBV high efficiency synchronous step-down converter mentioned above. The non-limiting example step-down converter accepts input voltages (VI) from 2.5 to 6.0 volts and steps the voltage down to 1.8 volts. The TPS62202 DBV can source up to 300 milliamps of current with up to 96% efficiency. The device has an adjustable output voltage and is set with a resistive divider between the output Feedback (FB) and ground. The topology includes an integrated switch mode step-down converter and uses only one inductor and 2 decoupling capacitors for full operation. The supply may be enabled or disabled using the enable (EN) pin functionality.

The low power data processor 12a is preferably powered from the bootstrap supply. During unfavorable energy harvesting conditions, the data processor 12a preferably remains in a low standby mode, e.g., consuming less than 2 uA. Periodically, the data processor 12a samples the harvesting input voltage with an on board analog to digital converter. Upon the detection of favorable harvesting conditions, the processor applies charge pump control signals as shown in FIG. 5 and preferably performs a well-defined deterministic startup sequence. The inrush current is limited during startup conditions by controlling the duty cycle of the charge pump switch control to slowly charge the system bulk capacitance. During normal modes of operation, the data processor 12a intelligently controls the charge pump switch control logic based upon the sampled output voltage of the charge pump Vout2. An impedance matching software control algorithm, such as the example described below, effectively maximizes the power transfer from the harvesting device, e.g., the thermoelectric generator 16a. As explained above, to achieve very high conversion efficiency, the load of the DC to DC converter electronics must be matched very well to the output of the thermoelectric generator 16a. Although not required, high quality, low ESR capacitors are preferably used for the charge pump 14a to allow the data processor 12a to operate at a very low clock frequency range to minimize the processor system current drain.

The status of the DC to DC converter may be provided by the data processor 12a to allow interfacing the power supply 16a to electronic systems and facilitate diagnostic capabilities. During unfavorable harvesting conditions, a RESET signal can be asserted by the data processor 12a to provide a system reset. When favorable harvesting conditions exist, the RESET can be removed to enter a normal mode of operation. In the event of changing from normal operation to unfavorable harvesting conditions, a BROWN_OUT mode can be entered that indicates that power from the DC to DC converter may be lost in a relatively short time period, e.g., 100 mS. A state of charge flag may also optionally be provided and may be driven high when the battery 20a is fully charged.

Figure 7:
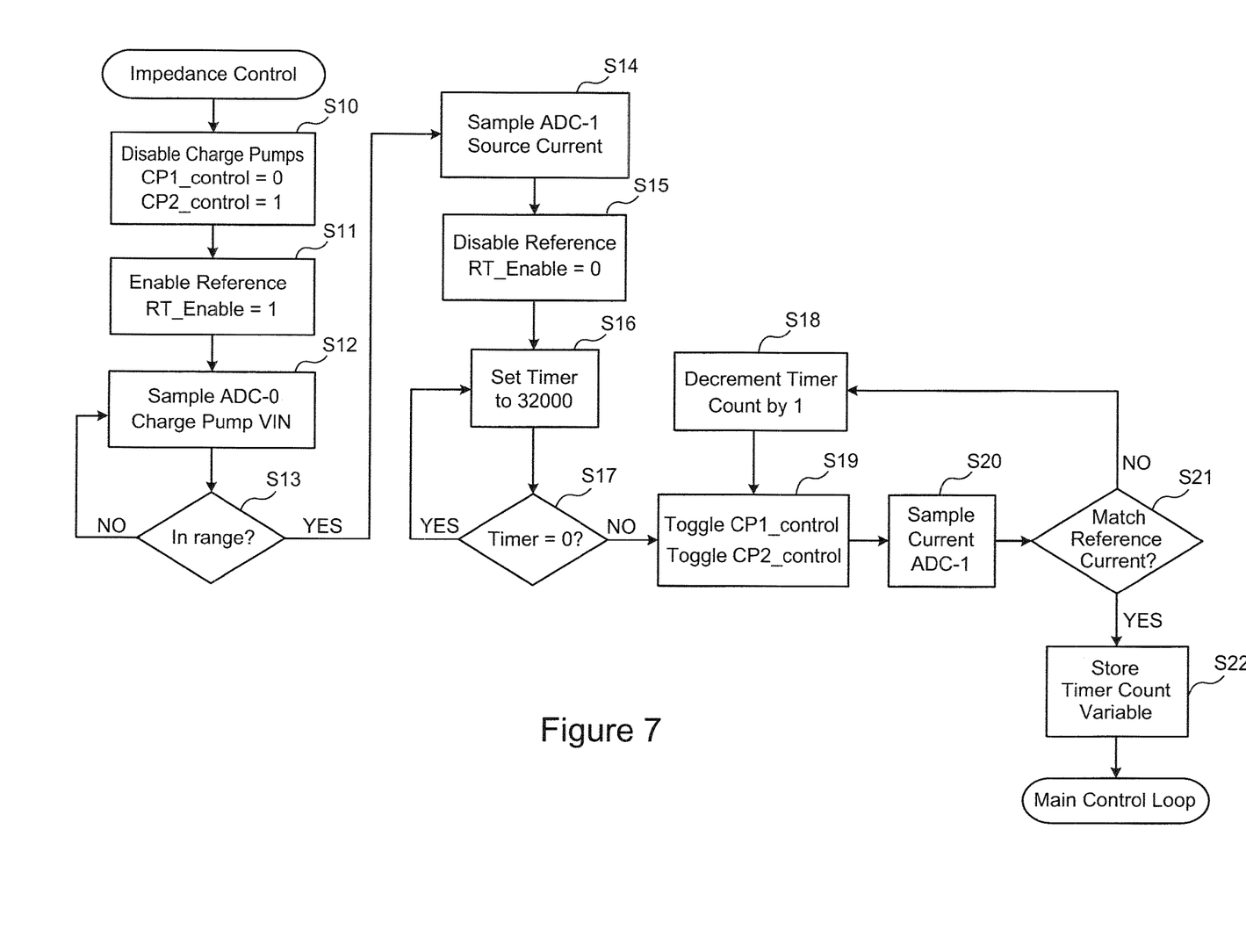
FIG. 7 is a flowchart illustrating non-limiting example procedures for impedance control for use with the non-limiting example in FIG. 4.

As mentioned above, the inventor determined that one way to impedance match the low voltage generator is to control the input impedance of the charge pump array. This control may be accomplished by controlling the charge pump flying capacitors and the switch control frequency. The data processor performs a calibration procedure to determine the switching frequency to match the energy harvesting or energy source characteristic output impedance. This procedure slowly charges the charge pump flying capacitors providing soft startup and inrush current control functionality. FIG. 7 is a flowchart illustrating non-limiting example procedures for impedance control for use with the non-limiting example in FIG. 4.

The charge pump array is initially disabled to isolate the harvesting device output load impedance during the procedure (step S10). This is accomplished by setting the CP1_control signal to 0 and the CP2_control signal to 1. A precision resistive termination is applied to the output of the energy harvesting device by asserting RT_Enable on the I/O port of the data processor 12a as shown in FIG. 4 (step S11). This results in the FET conducting to ground through the precision resistor RT. This operation allows the current of the thermoelectric generator to be measured in the same test conditions as specified by the device manufacturer into a precision matched reference load. The thermoelectric generator voltage is sampled using the data processor's ADC-0 with the resistive termination applied (step S12). The data processor 12a enters a standby mode when the output voltage is less than a predetermined amount (step S13). One non-limiting example amount could be 20 millivolts. When the sample voltage from the thermoelectric generator 16a is within a predetermined desired range, the value of that sample voltage is stored in a memory as a variable Charge Pump VIN (step S14). One non-limiting example range could be 0.020 to 4.0 Volts. The thermoelectric generator output current is also measured with the precision termination applied by sensing the voltage drop across a resistor in conjunction with a differential amplifier and sampling that current at the ADC-1 IN port of the data processor 12a (step S15). The current is stored as variable reference current. One non-limiting example resistor is a precision 0.10Ω 1% resistor.

Thereafter, the termination resistor is removed by de-asserting RT_Enable (step S16), and a timer is loaded with a predetermined value. One non-limiting example timer value is 32000. Each respective charge pump setting is then enabled: CP1_control=logic high, CP2_control=logic low. The charge pump impedance is monitored using the ADC-1 port to measure the current while slowly adjusting the switching frequency of the respective CP1_control and CP2_control signals (step S19). The ADC-1 sample (step S20) is compared to the stored reference current variable (step S21). If they match, the charge pump impedance is calibrated, the timer value is stored as variable Timer Count (step S22), and control returns to a main control loop like that shown in FIG. 3. Otherwise, if the ADC-1 sample does not match the reference current, the timer value is decreased by 1 (step S18), and the CP1_control and CP2_control signals from the data processor are toggled (complemented) (step S19). Although this impedance matching is highly desirable to be performed throughout operation to achieve higher efficiency, other implementations are possible such as only doing the impedance matching only at start up, only infrequently, only once, etc.

Figure 8:
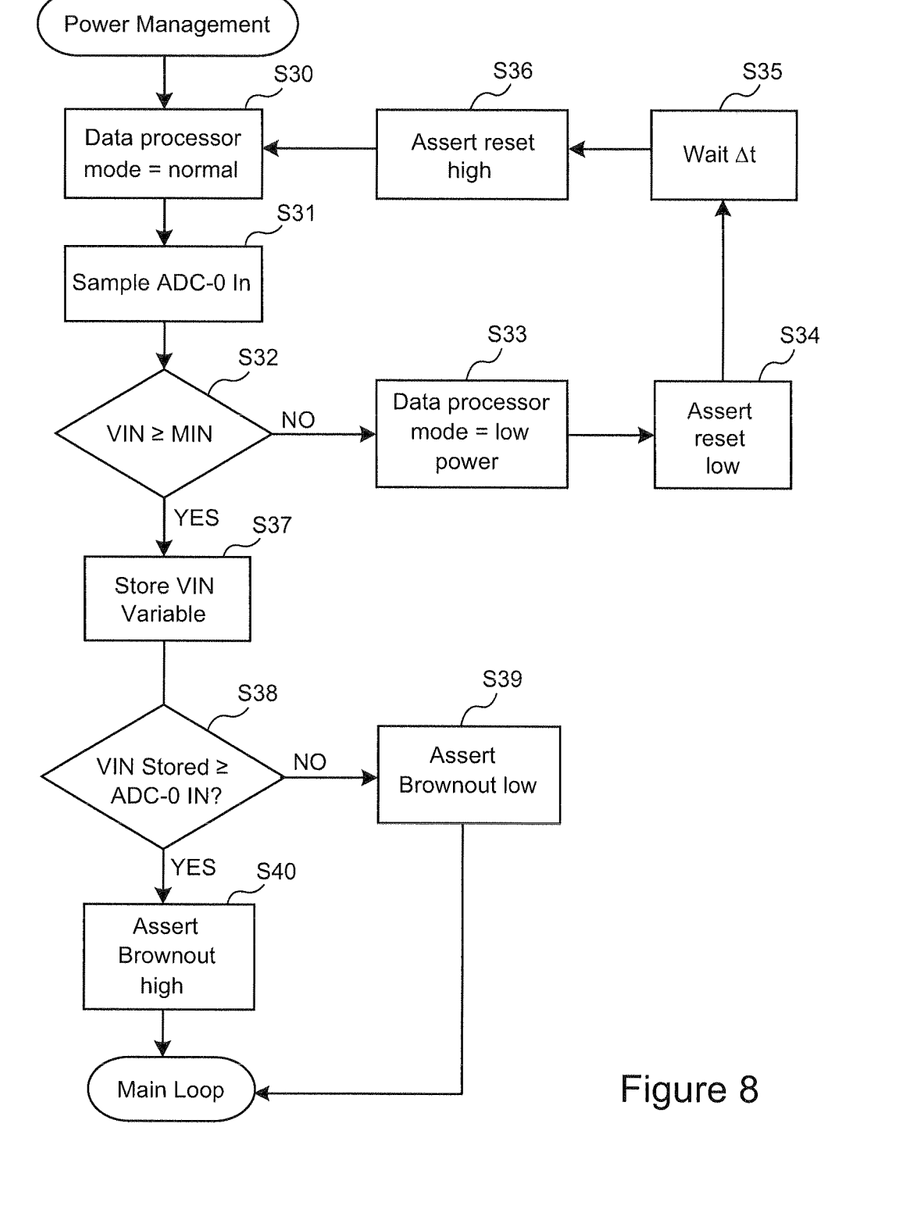
FIG. 8 is a flowchart illustrating non-limiting example procedures for power management for use with the non-limiting example in FIG. 4.

FIG. 8 is a flowchart illustrating non-limiting example procedures for power management for use with the non-limiting example in FIG. 4. The power management algorithm determines the mode of operation for the data processor 12a by monitoring and detecting change in the thermoelectric energy source output conditions. One function of the power management function is to limit and reduce/minimize the current drain of the data processor 12a. Again, power management is useful in many applications but it may be optional in others.

Initially, the data processor mode registers are set for normal low power mode (step S30). The thermoelectric energy source output voltage is sampled using the ADC-0 port of the data processor 12a (step S31). A decision is made whether the ADC-0 input voltage is within the predetermined operating range (step S32). If not, the data processor is preferably placed into a deep sleep (lowest current drain) mode of operation, and a charge pump VIN variable is set to a predetermined value (step S33). A Reset mode is asserted (step S34) with the processor entering a low power mode for a predetermined time, (one non-limiting example value might be 300 seconds), (step S35), after which the Reset is removed (step S36), and the data processor mode is set to normal (step S30).

If the input voltage is within range, it is stored (step S37) and compared to a previously stored value of the input voltage (step S38). If the stored value of the voltage is greater than the current value, i.e., the voltage is decreasing, then a brownout mode is asserted (step S40); otherwise, a brownout is not asserted (step S39), and control returns to the main loop.

Figure 9:
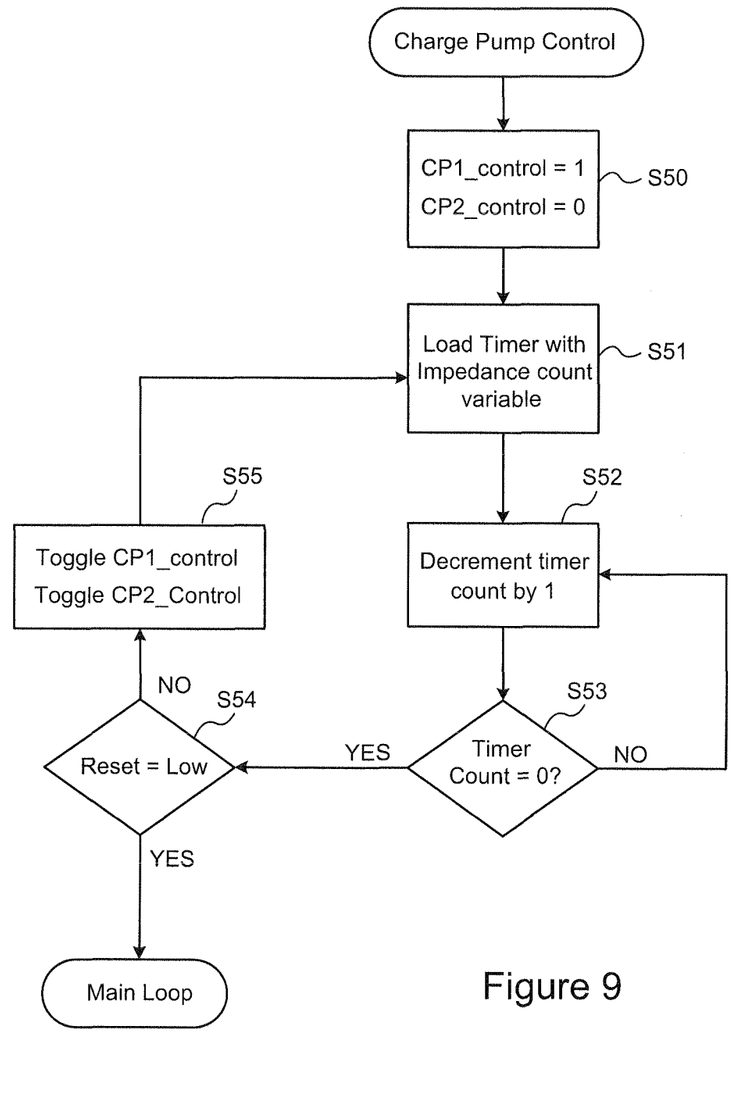
FIG. 9 is a flowchart illustrating non-limiting example procedures for charge pump control for use with the non-limiting example in FIG. 4.

FIG. 9 is a flowchart illustrating non-limiting example procedures for charge pump control for use with the non-limiting example in FIG. 4. The charge pump control algorithm controls the timing for each respective charge and transfer cycle of the dual charge pump array in FIG. 5. The data processor 12a outputs CP1_control and CP2_control at a complementary duty cycle/frequency calculated by the Impedance Control algorithm in FIG. 7. Initially, the processor sets CP1_control=logic high and CP2_control=logic low (step S50). A timer is loaded with the Impedance Count Variable produced in step S22 in FIG. 7 (step S51). The timer is decremented by 1 (step S52), and a decision is made in step S53 whether the timer count is 0. If not, control returns to step S52. If so, a decision is made whether the data processor is reset (step S54). If not, control returns to the main loop. If the processor is reset, then the control signals CP1_control and CP2_control are toggled or complemented, i.e., switched to the opposite logic state (step S55), and control returns to step S51.

In DC circuits, impedance and resistance are the same, and are defined as the voltage across an element divided by the current (R=V/I). In AC circuits, such as the charge pump array, reactance enters the equation due to the frequency-dependent contributions of capacitance, inductance, and data processor switch control frequency. The AC impedance is still measured in ohms and represented by the equation (Z=V/I), but V and I are frequency dependent. The input impedance of the charge pump array is determined by the variable control switching frequency and fixed charge pump capacitors. During the calibration algorithm, the frequency of the data processor charge pump controls are increased to match the ideal resistive reference load current.

Experimental test results for the non-limiting example DC to DC converter shown in FIG. 4 are now described. In the absence of a method to generate precise thermal gradients, a DC to DC power conversion/management prototype was powered from a precision laboratory power supply during the test experiments. The lab supply connections were isolated with 1% 1'Ω and 10'Ω resistors respectively to facilitate a method to measure current drain. The voltage measurements were taken using two calibrated Fluke 77 III digital voltmeters.

Figure 10:
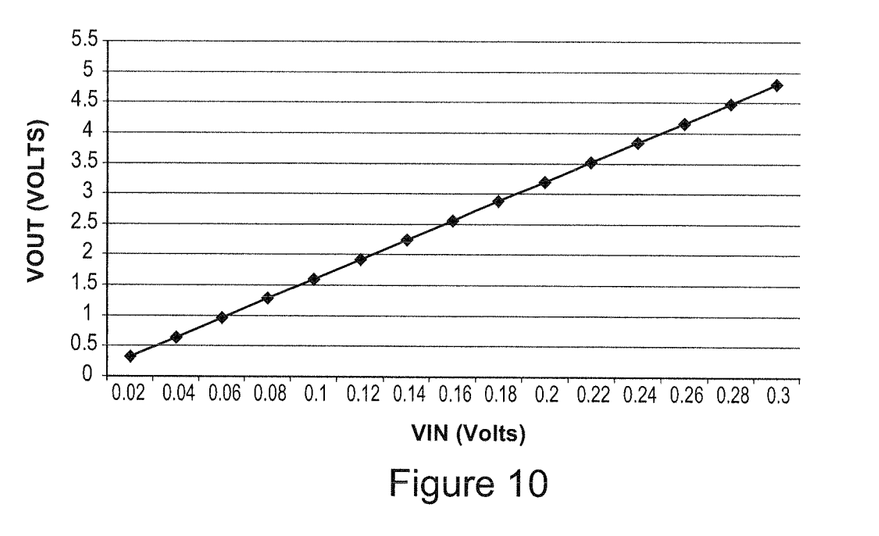
FIG. 10 is a graph of VOUT2 versus VIN voltage for a non-limiting example test DC to DC converter.

In a first experiment, the boost power supply operation was evaluated. During this test, 20 mV was applied to the VIN input while observing the output voltage of VOUT2 with a 10K ohm load resistor. The digital voltmeter measurement at VOUT2 (TP5) was +0.32 volts. VIN was changed in 20 mV increments while monitoring the voltage at VOUT2. The DC to DC converter boost results are shown in FIG. 10. In FIG. 10, the output voltage is 16 times the input voltage and linearly scales accurately to the small input voltages.

Figure 11:
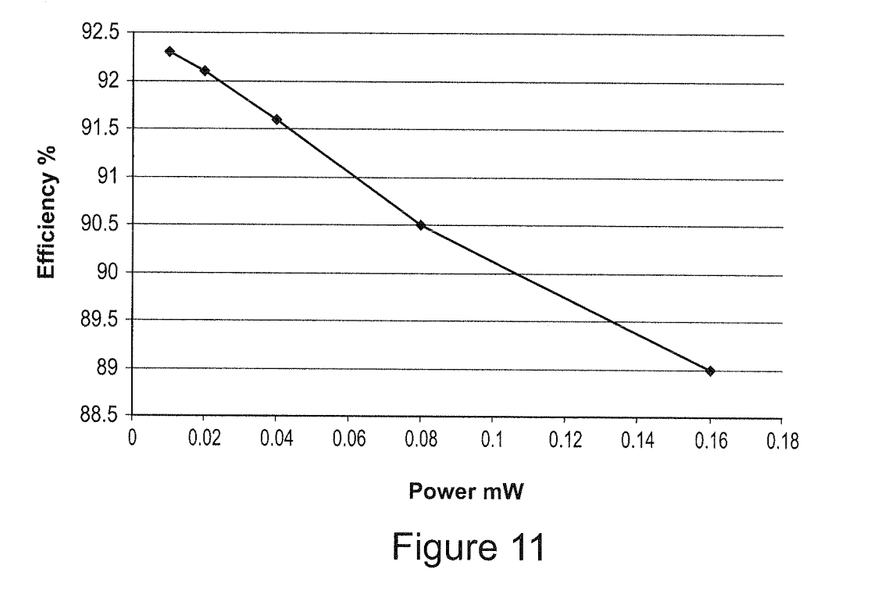
FIG. 11 is a graph of DC to DC conversion efficiency versus for the non-limiting example test DC to DC converter and the respective power output generated.

In the test experiment, the efficiency of the DC to DC converter was measured over a 10-150 mW range by measuring the input power verses the output power. A resistive load was placed on the output of VOUT2 to present a 10-150 mW load. The voltage drop was measured for each load condition. The VIN voltage and current were measured for each respective load. The output power was calculated by multiplying the output voltage by the output current. The input power was calculated in the same manner by multiplying the input voltage by the output current. The conversion efficiency was calculated for each respective test case using the formula below and is shown in FIG. 11.

$$\text{Efficiency} = \frac{POUT}{PIN} \times 100$$

Figure 12:
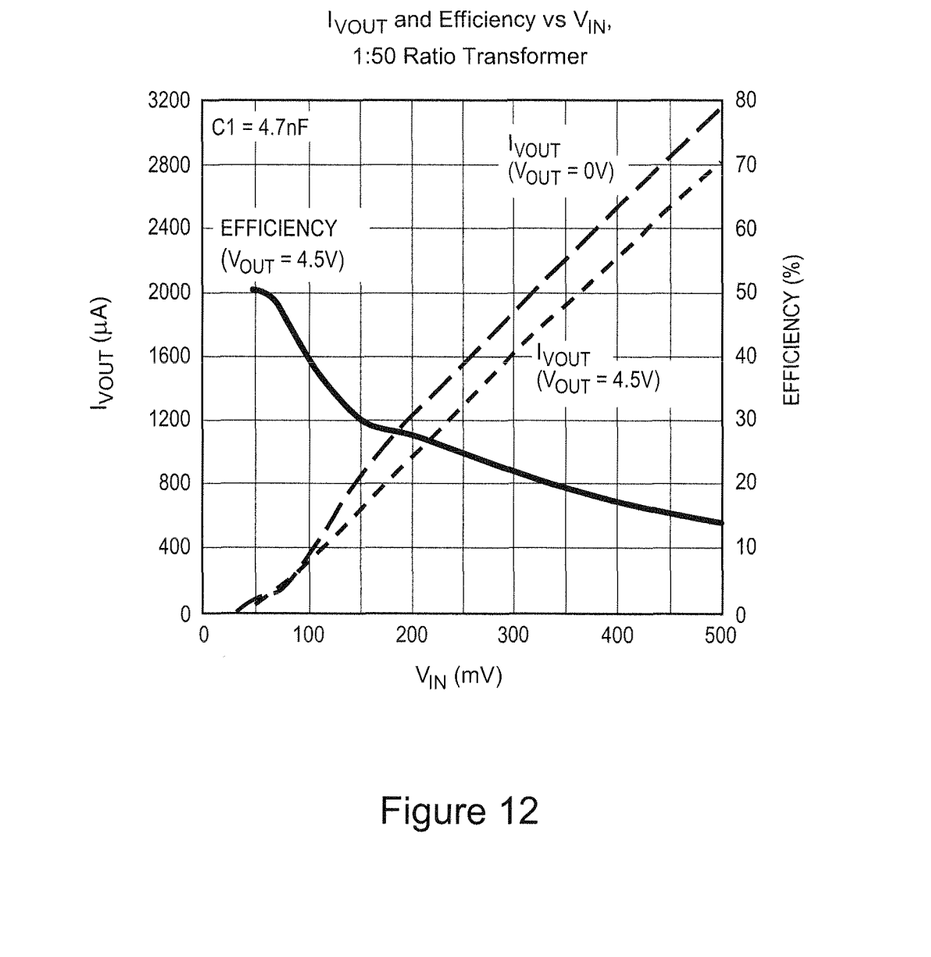
FIG. 12 is an efficiency graph for a known ultralow voltage step-up converter and power manager.

An integrated step-p converter offered by Linear Technology, the LTC3108 (Linear Technologies Corporation, "LTC3108 Ultralow Voltage Step-Up Converter and Power Manager," 2010) operates from 20 mV, but the power levels and efficiency are much lower than the example DC to DC converter in FIG. 4. Comparing FIGS. 11 and 12 demonstrates that the example DC to DC converter in FIG. 4 is far superior.

The innovative ultra low power DC to DC energy conversion and management technology described above bridges a gap between low power energy harvesting and low power electronic devices. Intelligent and deterministic power management functionality is provided that can achieve ultra-low input DC to DC converter operating voltage, a wide operating range, high efficiency power conversion greater than 90%, and very low quiescent standby and operational current drain, all with low component and manufacturing cost.

Any application requiring modular, low power, extended maintenance cycles may benefit from the inclusion of an energy harvesting device to replenish or replace batteries. Example non-limiting applications for the technology in this application include ultra-low power wireless sensors and other instrumentation, consumer electronics, portable electronic devices like cell phones, video games, hand-held computing, and portable medical devices, first responder monitoring systems, medical systems, military devices, and security systems. But any applications requiring modular low power will benefit from this novel power conversion and harvesting technology. By permitting device operation below sub threshold voltage levels, creating an entirely new class of self powered electronics.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for low voltage conversion and energy storage using a charge pump array including a first set of capacitors in parallel with a second set of capacitors and switches for selectively coupling the first and second set of capacitors to a variable input DC voltage, the method comprising:
   a controller controlling one or more of the switches to couple the first and second set of capacitors to the variable input DC voltage for a variable first time period during which the input DC voltage charges the first and second set of capacitors to a DC voltage level, the variable input DC voltage being as low as 20 mV, and
   the controller controlling one or more of the switches to couple the charge pump array output to an energy storage device switchably coupled to an output of the charge pump array for a variable second time period during which a voltage stored across each of the capacitors during the first time period is combined to produce a higher voltage significantly higher than the input DC voltage, the higher voltage being provided to the energy storage device,
   wherein the variable input DC voltage is provided by a low voltage generator, and wherein the method further comprises dynamically matching an impedance of at least the charge pump array to an impedance of the low voltage generator.

2. The method in claim 1, further comprising detecting an impedance of the low voltage generator and varying the first and second variable time periods based on the detected impedance of the low voltage generator so as to match the impedance of at least the charge pump array to the detected impedance of the low voltage generator.

3. The method in claim 1, further comprising controlling a timing and/or duration of the first and second variable time periods.

4. The method in claim 1, wherein a conversion efficiency from the input DC voltage to the higher voltage is 90% or more.

5. The method in claim 1, wherein the energy storage device is a rechargeable battery.

6. An apparatus for low voltage conversion and energy storage, comprising:
   a charge pump array including a first set of capacitors in parallel with a second set of capacitors and switches for selectively coupling the first and second set of capacitors to a variable input DC voltage, the variable input DC voltage being as low as 20 mV;
   a controller configured to control one or more of the switches to couple the first and second set of capacitors to the variable input DC voltage for a variable first time period during which the input DC voltage charges the first and second set of capacitors to a DC voltage level,
   the controller configured to control one or more of the switches to couple the charge pump array output to an energy storage device switchably coupled to an output of the charge pump array for a variable second time period during which a voltage stored across each of the capacitors during the first time period is combined to produce a higher voltage significantly higher than the input DC voltage, the higher voltage being provided to the energy storage device, and a low voltage generator configured to provide the variable input DC voltage, and wherein the controller is further configured to dynamically match an impedance of at least the charge pump array to an impedance of the low voltage generator.

7. The apparatus in claim 6, wherein the controller is configured to control a timing and/or duration of the first and second variable time periods.

8. The apparatus in claim 6, wherein a conversion efficiency from the input DC voltage to the higher voltage is 90% or more.

9. The apparatus in claim 6, wherein the energy storage device is a rechargeable battery.

10. An apparatus for low voltage conversion and energy storage, comprising:

a charge pump array including a first set of capacitors in parallel with a second set of capacitors and switches for selectively coupling the first and second set of capacitors to a variable input DC voltage;

a controller configured to control one or more of the switches to couple the first and second set of capacitors to the variable input DC voltage for a variable first time period during which the input DC voltage charges the first and second set of capacitors to a DC voltage level, the controller configured to control one or more of the switches to couple the charge pump array output to an energy storage device switchably coupled to an output of the charge pump array for a variable second time period during which a voltage stored across each of the capacitors during the first time period is combined to produce a higher voltage significantly higher than the input DC voltage, the higher voltage being provided to the energy storage device; and a low voltage generator configured to provide the variable input DC voltage, and wherein the controller is further configured to match an impedance of at least the charge pump array to an impedance of the low voltage generator, wherein the controller is configured to detect an impedance of the low voltage generator and vary the first and second variable time periods based on the detected impedance of the low voltage generator so as to match the impedance of at least the charge pump array to the detected impedance of the low voltage generator.

* * * * *